(12) United States Patent
Preijert et al.

(10) Patent No.: US 7,721,443 B2
(45) Date of Patent: May 25, 2010

(54) METHOD FOR PRODUCING A VEHICLE AXLE

(75) Inventors: Stefan Preijert, Göteborg (SE); Leon Fuks, Angered (SE)

(73) Assignee: International Rectifier Corporation, El Segundo, CA (US)

( * ) Notice: Subject to any disclaimer, the term of this patent is extended or adjusted under 35 U.S.C. 154(b) by 628 days.

(21) Appl. No.: 10/605,340

(22) Filed: Sep. 23, 2003

(65) Prior Publication Data
US 2004/0123462 A1    Jul. 1, 2004

Related U.S. Application Data

(63) Continuation of application No. PCT/SE02/00501, filed on Mar. 18, 2002, now abandoned.

(30) Foreign Application Priority Data
Mar. 23, 2001   (SE) .................................... 0101046

(51) Int. Cl.
   *B21D 53/88* (2006.01)
   *B21D 39/00* (2006.01)
(52) U.S. Cl. .................... 29/897.2; 29/447; 29/463; 29/525.14
(58) Field of Classification Search ................ 29/897.2, 29/447, 463, 469.5, 505, 525.14
   See application file for complete search history.

(56) References Cited

U.S. PATENT DOCUMENTS

| | | | | |
|---|---|---|---|---|
| 2,674,783 A | * | 4/1954 | Schneider et al. | 228/173.6 |
| 3,697,725 A | * | 10/1972 | Bielefeldt | 219/388 |
| 3,793,703 A | * | 2/1974 | Winkler et al. | 29/463 |
| 5,429,423 A | | 7/1995 | Pollock et al. | 301/124.1 |
| 5,934,544 A | * | 8/1999 | Lee et al. | 228/146 |
| 6,122,948 A | | 9/2000 | Moses | 72/61 |

FOREIGN PATENT DOCUMENTS

| | | |
|---|---|---|
| DE | 722718 A | 7/1942 |
| EP | 0015648 A1 | 9/1980 |
| EP | 00529038 A2 | 9/1982 |
| EP | 0181203 A2 | 5/1986 |
| JP | 11011105 A | 1/1999 |

* cited by examiner

*Primary Examiner*—Jermie E Cozart
(74) *Attorney, Agent, or Firm*—Novak Druce + Quigg LLP

(57) ABSTRACT

Method and apparatus for providing a hollow, elongated construction element, for example for use as a vehicle front axle. The method includes (1) directing a first blank through a furnace (2) for heating the blank to a working temperature. The blank is directed between a pair of rollers (3, 4) having profiled surfaces, the blank being preformed in one or more steps to form an intermediate product having a predetermined profile along its longitudinal extent. The blank is fed to a forging press having a number of cooperating die pads, the blank being worked in a plurality of steps (5, 8, 11) to form a substantially finished product, having a cross section substantially in the form of a hat profile of predetermined varying height, width and material thickness along its length. A second blank (14), having essentially the same profile as the hat profile of the first blank in the dividing plane of the cooperating die pads, is placed in connection with the hat profile. In a later step (15), the first (1) and the second blank (14) are joined together, at least along their respective edges, to form a composite hollow construction element (18). One embodiment of the disclosed invention is also the construction element that is produced according to the above-described method.

3 Claims, 6 Drawing Sheets

METHOD FOR PRODUCING A VEHICLE AXLE

CROSS REFERENCE TO RELATED APPLICATIONS

This present application is a continuation patent application of International Application No. PCT/SE02/00501 filed 18 Mar. 2002 which was published in English pursuant to Article 21(2) of the Patent Cooperation Treaty, and which claims priority to Swedish Application No. 0101046-1 filed 23 Mar. 2001. Both applications are expressly incorporated herein by reference in their entireties.

BACKGROUND OF INVENTION

1. Technical Field

The invention relates to a method for producing hollow, composite construction elements, preferably intended for use in vehicles, and a construction element produced according to the method.

2. Background Art

In many fields, there is currently a demand for weight-optimized products with maintained functioning and strength. This applies especially to forged products, which can be heavy and difficult to optimize because of limitations inherent to the tools used in their production.

One example is front axle beams for heavy vehicles. These beams are typically forged as an I-profile in which the web, or core of the beam cross section has little effect upon the torsional rigidity. Using strength calculations, it can be shown that a tubular cross section, with the material moved as far radially outwards as possible, is best for such a construction. This applies especially to the portion that is commonly referred to as the "swan neck" in the front axle beam which is located between a central part and a spindle holder of the beam. With traditional forging methods, it is difficult to achieve such a solution. European publication EP-A2-0 059 038 shows a front axle beam forged horizontally in the traditional manner; that is to say that the blank lies with its final vertical plane (after being fitted) in the horizontal plane as it is worked. Therein, it is described how a blank is pre-formed by means of rolling and is subsequently moved between a number of presses which forge the whole or parts of the blank into the desired shape. As previously stated, the drawback with the solution is that the web of the beam, for the greater part, is centrally located, which has little effect upon the torsional rigidity.

An alternative solution can be seen from European publication EP-A1-0 015 648 which describes the forging of a rectangular, hollow front axle beam starting from a tubular blank. Although it is possible with this method to obtain a beam with higher torsional rigidity, it also creates a number of problems. In order to produce tapered ends of the beam, the tubular blank has to be drawn through a die. Even if the material is distributed radially, viewed further out from the center of the beam, the possibility of controlling the material thickness is very limited. This also applies to the other parts of the beam, since the starting material is a tube of constant material thickness. In addition, a great deal of working of the ends of the beam is required, in order to produce spindle holders, and fitting of separate fixtures for such things as air bellows.

A further solution can be seen from U.S. Pat. No. 6,122,948 that shows a hydro-formed front axle beam. In this case too, the starting point is a tubular blank, which is first bent into the desired basic shape and is subsequently hydro-formed into its final shape. One drawback with this solution is, like the example above, that the distribution of the material along the length of the profile cannot be controlled. The profile must also be provided with a plurality of separate fastenings, not only for the air bellows but also fixtures for the steering spindle bolts. The latter have to be fastened by, for example, welding which gives the beam a natural weakening susceptible to corrosion.

Finally, it is also possible to cast hollow front axle beams, as can be seen from JP-A-11-011105. For technical reasons of casting practice, there are restrictions, however, in terms of maximum and minimum material thickness, as well as the need for strengthening ribs, complicated casting cores and the like in order to allow a sufficiently advanced profile to be cast. In addition to this, there are further restrictions in terms of a practical choice of material, as well as financial implications for the unit price of the axle beams owing to the heavily increased costs that a casting process entails.

The majority of the abovementioned problems are solved by the production method conducted according to the present invention that is disclosed herein because the method offers a substantially greater chance of precisely controlling the distribution of material around and along a forged profile.

SUMMARY OF INVENTION

The invention relates to a method for producing a hollow, elongated construction element, and to a construction element produced by this method. In an exemplary embodiment, the method comprises (includes, but is not limited to) the following steps which are therefore not all-inclusive, nor restricted to the order in which they are listed. The steps, however, include (1) a first blank being directed through a furnace for heating to a working temperature; (2) directing the blank between a pair of rollers having profiled surfaces, the blank being preformed in one or more steps to form an intermediate product having a predetermined profile along its longitudinal extent; (3) the blank being fed to a forging press having a number of cooperating die pads, the blank being worked in a plurality of steps to form a substantially finished product, having a cross section substantially in the form of a hat profile of predetermined varying height, width and material thickness along its length; (4) a second blank, having essentially the same profile as the hat profile of the first blank in the dividing plane of the die pads, is placed in connection with the hat profile; (5) the first and the second blank being joined together at least along their respective edges to form a composite hollow construction element. In contrast to the background art, at least the first blank is forged vertically; that is, the principal vertical plane of the blank, while being worked, substantially coincides with the plane in which the construction element is intended to be fitted.

The starting material can be a square or rectangular blank cut to the desired length. This tubular portion is then heated in a furnace to a suitable working temperature. For example, if air-hardening, microalloyed steel is used, the blank would exemplarily be heated to 1250-1300° C., and preferably to 1280° C. Then, the blank is given a suitable cross-sectional shape by means of a pair of rotating rollers that can be made adapted to be profiled. The rolled blank is subsequently moved to a forging press for working into a final shape.

The forging operation comprises a first step in which a pair of first cooperating die pads form the material in the first blank such that it acquires a predetermined, varying height in a vertical plane along its longitudinal extent, the blank acquiring its principal basic shape in this plane. The blank is then moved to another forging press which performs a second step in which a pair of second cooperating die pads form the material in the first blank such that it acquires a predetermined, varying thickness along one or more of the side surfaces, bottom surface and upper edge surfaces of the profile along its longitudinal extent. This second step is repeated one or more times in further forging presses in which successive die pads form the blank until it has acquired its final shape. It is thereby possible to re-distribute the material of the blank both in its cross section and along its longitudinal extent. Through suitable configuration of the die pads, the blank can be formed freely, as far as the forging process allows, along both its inner and its outer periphery.

In order to produce a closed profile, the first blank must be joined together with a second blank. The second blank starts out from a flat starting material in the form of a plate, the thickness and width being chosen such that they match the requirements in terms of profile strength and the width of the first blank. The second blank can either be pre-formed in a separate forging operation in which it is formed in a separate press to the same profile as the hat profile of the first blank in the dividing plane of the die pads, or in a joint forging operation in which the second blank is placed on the first blank and formed to the same profile as the hat profile of the first blank in the dividing plane of the die pads in a common press.

Before the first and the second blank are joined together to form a joint construction element, at least the outer edges of the respective blank are additionally heated. This can be done by heating the first and the second blank in a pair of separate induction furnaces, after which they are placed between a pair of cooperating die pads in a press and joined together by forge welding. Alternatively, the first and the second blank are simultaneously heated using heating means introduced between the first and second blank, which blanks are held between a pair of cooperating die pads in a press, after which they are joined together by forge welding. The heating means can be constituted by induction elements, an induction furnace, gas flames and the like.

In a final operation, so-called flashes are cut off along the joined edges of the profile. This can either be done during the same press operation as for joining together the first and second blank, or by a separate trimming of the outer edges of the composite profile. The profile thus acquires a predetermined varying width along its entire longitudinal extent.

The final result is a hollow, elongated construction element comprising a first section having a cross-section substantially in the form of a hat profile of a predetermined, varying width, height and material thickness along its length, and a second section that has an essentially constant material thickness and is joined together with the first section along the side surfaces of the hat profile. This configuration offers greater opportunity to optimize the material thickness of the construction element compared to known construction methods. Firstly, the material can be distributed such that maximum thickness is obtained where the loads on the construction element are greatest; and secondly, a material displacement towards the periphery of the construction element is obtained thereby increasing the member's torsional rigidity. A hollow profile of this type also offers considerable weight savings compared with a corresponding traditionally forged product.

In order to further increase the strength, the construction element can be manufactured from an air-hardening, microalloyed steel. The product does not therefore need to be hardened or otherwise heat-treated after the joining of the two sections. It is, of course, possible to use steels of a different quality, but in that case a further cost-increasing heat treatment or other after-treatment may be necessary to achieve the desired strengths.

A construction element suitably made according to the above method is a front axle beam of a vehicle, and especially a heavy commercial vehicle. By employing the above construction method, it is possible to produce a beam having as much as thirty percent less weight than a comparable, traditionally manufactured, horizontally forged beam such as that exemplified in EP-A2-0 059 038 discussed hereinabove.

As previously mentioned, it is possible to optimize the production method so that the maximum material thickness of such a front axle beam is obtained in connection with fastening points and regions which are to be subjected to external forces and moments. The method makes it also possible to adapt the cross section of the front axle beam such that it acquires essentially the same outer contours in both the vertical and horizontal planes as a traditionally forged, solid beam. By giving the outer contours of the beam the same so-called "offset" (shape in the horizontal plane along the length of the beam) and "drop" (shape in the vertical direction) as a standard beam for a certain vehicle, it can be used without requiring modification being made to existing vehicle design. It is also possible to maintain existing fastening points (so-called "interfaces") for steering spindle holders, springs and the like which interact with such beams.

BRIEF DESCRIPTION OF DRAWINGS

The invention will be described in greater detail in the following description of a preferred embodiment, shown by way of example, with reference to the appended drawings, in which.

DETAILED DESCRIPTION

Figure 1:
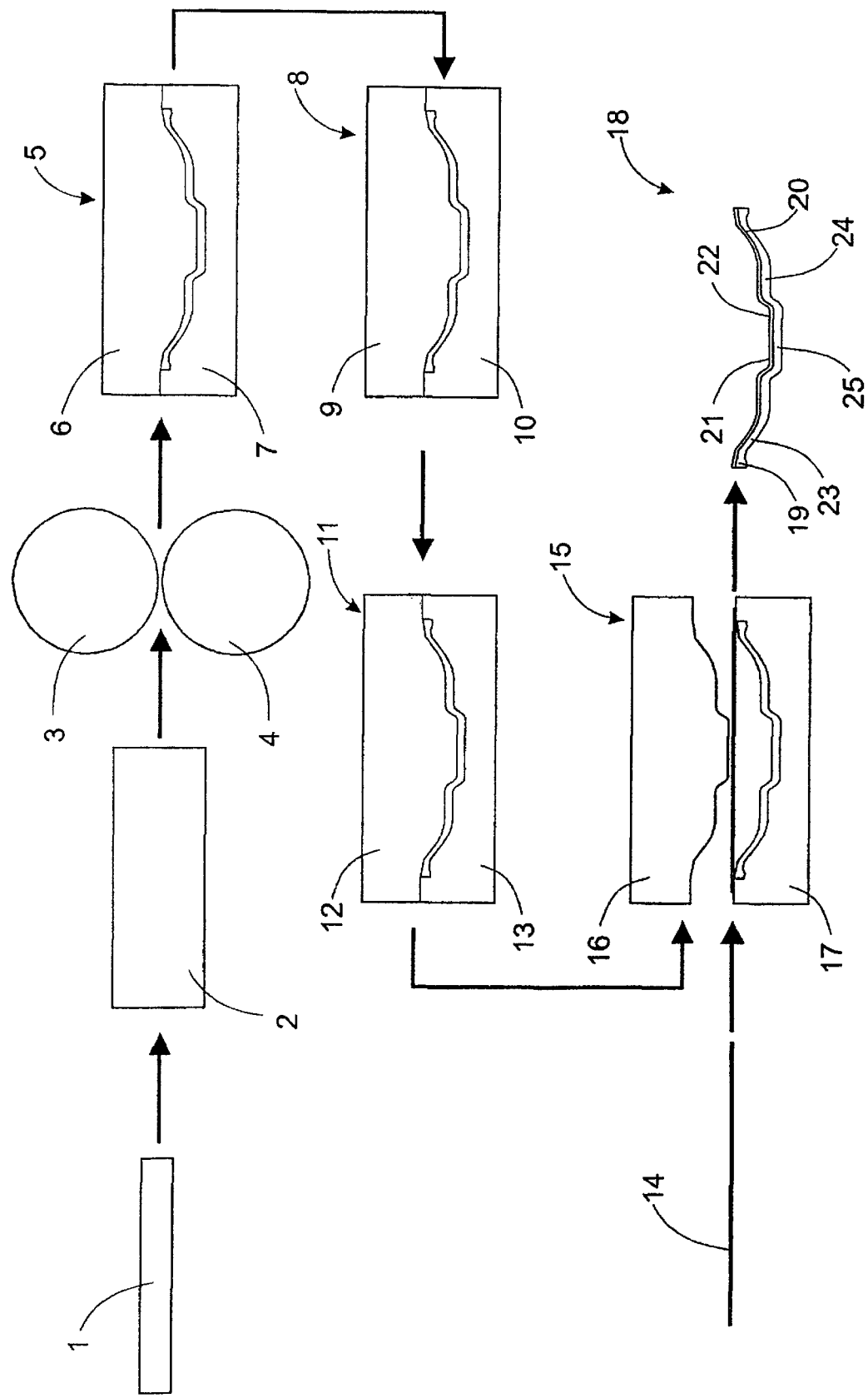
FIG. 1 is a diagrammatic representation of the steps embraced by a preferred embodiment of a manufacturing method conducted according to the teachings of the present invention.

FIG. 1 diagrammatically illustrates a preferred embodiment of a method conducted according to the teachings of the present invention which includes a number of steps for the production of a composite hollow construction element, exemplarily, a front axle beam for heavy vehicles.

A first blank 1, which has been cut to a predetermined length, is directed through an induction furnace 2 in which it is heated to working temperature. Where, for example, air-hardening, microalloyed steel is used, the blank is heated to 1250-1300° C., and preferably to 1280° C. Once the correct temperature has been reached, the blank is directed through a pair of profiled rollers 3, 4, which are profiled (exteriorly adapted) to give the blank 1 a suitable initial cross section along its longitudinal extent. Through suitable configuration of the respective profiles of the rollers 3, 4, an intermediate product is obtained, whose cross section and material thickness varies along the length of the blank in a way that at least partially corresponds to the finished product, or to a rough approximation of its final hat profile. In this stage, the blank 1 is still essentially straight, at least along the peripheral edges, with a number of recesses along the central part.

In the next step, the preformed blank is moved to a first forging press 5, having upper and lower cooperating die pads 6, 7. In this forging press 5, the blank 1 begins to be formed so that its cross section acquires a more pronounced hat profile in certain predetermined regions in which high torsional resistance is desirable. Examples of such regions are the so-called swan necks 23, 24 at the outer ends of the front axle beam, which swan necks connect a pair of steering spindle holders 19, 20 to the central section 25 of the beam. In other regions, where high bending resistance is desirable, transverse ribs are maintained between opposite vertical sides of the profile. Examples of such regions are fastening points 21, 22 for the resilient elements (not shown) that are placed between the vehicle chassis and the front axle beam. Such resilient elements can be constituted, for example, by air bellows. In addition to the forming of the cross section of the blank 1, a start is also made on deformation in the vertical direction in order to give the beam the desired shape and/or vertical height, also referred to as "drop", along its longitudinal extent. This forming gives the blank a varying height, measured in a vertical plane, and a varying distance from a horizontal plane through the outer ends of the blank 1. The maximum vertical height of the finished beam and its maximum distance from the horizontal plane coincide with the central part of the beam.

In subsequent steps, the blank is moved to second and third forging presses 8, 11 having upper and lower die pads 9, 10 and 11, 12, respectively. When the blank leaves the third forging press 11, it has acquired its final shape and is ready to be joined together with a second blank 14 to form a composite hollow beam.

The number of steps required to obtain the desired shape of the blank can, of course, be varied within the scope of the invention, since the number is directly dependent on the properties of the starting material and the desired degree of deformation.

The second blank 14 consists of a straight plate of a predetermined length and essentially the same width as the first, finished blank 1. In order to join together the first and the second blanks 1, 14, the two components are directed into a fourth forging press 15 having cooperating die pads 16, 17 in which the second blank 14 is positioned and held in position above, but vertically separate from, the first blank 1. Before the blanks can be worked and joined together, induction elements are introduced between the two blanks in order to heat them to a working temperature suitable for the chosen material. The second blank 14 is then placed in contact with the lower, first blank 1 for subsequent working.

According to an alternative embodiment, it is also possible to heat the second blank 14 separately before introducing it into the forging press. The two blanks can also be heated by means of gas flames or the like.

When the die pads 16, 17 of the forging press are brought together, a deformation of the upper, second blank 14 is performed so that it acquires the same shape as the upper surface of the first blank, and the blanks are joined together by forge welding along all surfaces where the first and the second blank are in mutual contact following deformation of the second blank 14. In association with the first and the second blank being forge-welded together, surplus material (for example flashes) around the edges of the workpiece can be cut and removed. In the illustrated example, the result is a composite, element of elongate construction taking the form of a hollow front axle beam.

Figure 1A:
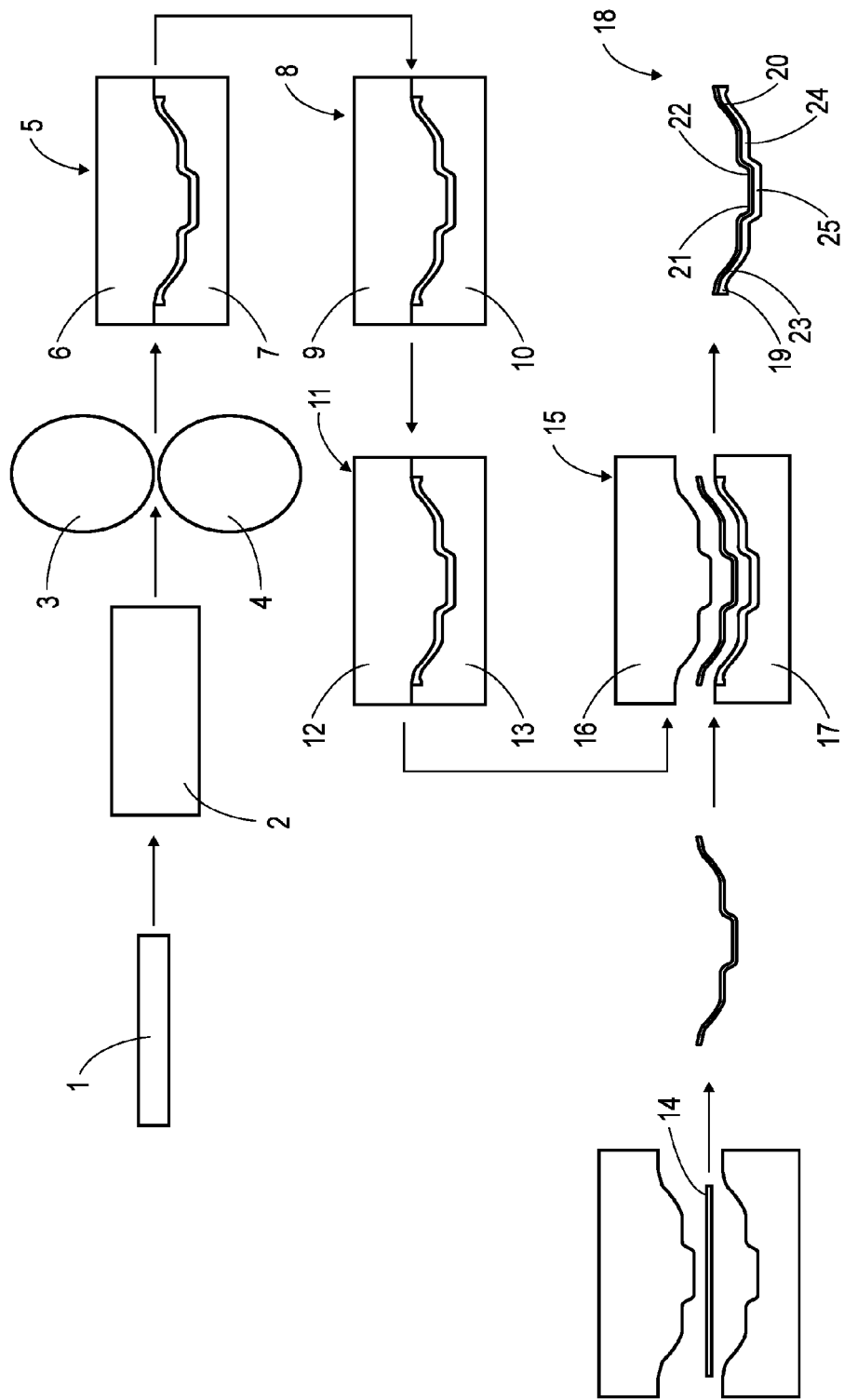
FIG. 1a is a diagrammatic representation of a slightly modified version thereof.

It is, of course, possible to pre-form the second blank 14 by deformation in a separate forging press before bringing it together with the first blank to be joined together, as illustrated in FIG. 1a.

When the front axle beam has been finally formed, it is subjected to a further machining in which fastening holes for the resilient elements are drilled and spindle holder fixtures are worked to their final shape and tolerance.

Figure 2:
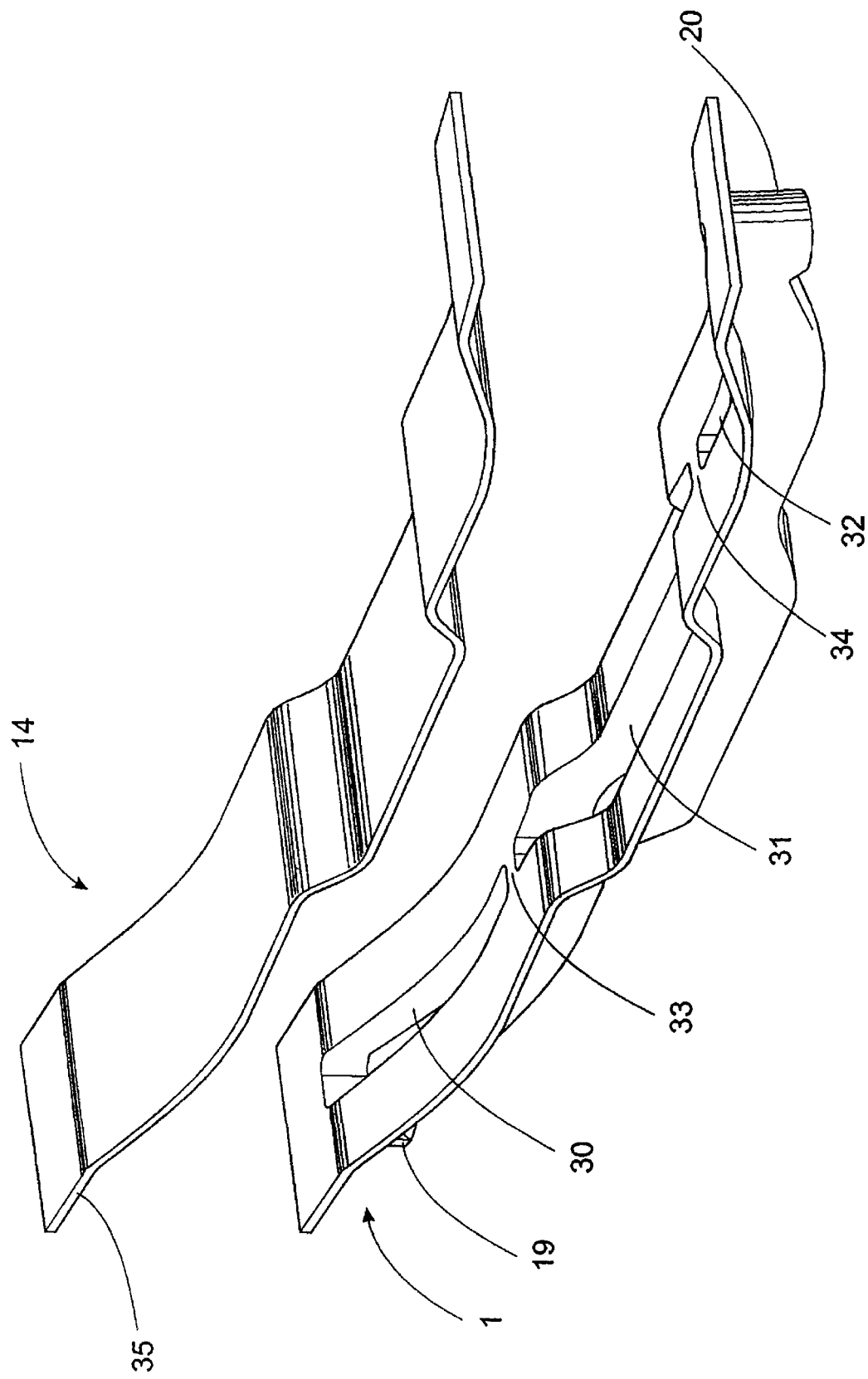
FIG. 2 is a perspective view of two formed sections prior to being finally joined together into a front axle beam, according to a preferred embodiment of the present invention.

FIG. 2 shows the first and the second blank 1, 14 as they appear after final deformation when they are ready to be joined together. In FIG. 2, the cavities 30, 31, 32 of the first blank 1 are clearly evident, as are transverse rein-forcing ribs 33, 34 and spindle holder fixtures 19, 20. In the illustrated embodiment, the edges 35 of the second blank 14 have a substantially even thickness along their length, but it is, of course, possible to vary the thickness of the blank, for example by forming it with thicker material thickness in regions that are exposed to high loads when fitted in a vehicle. This is expediently achieved by pre-forming the blank 14 separately, prior to the joining process. A separate pre-forming of the second blank 14 also provides scope to vary the thickness along both its longitudinal and its transverse direction. For example, the ends of the blank 14 can be provided with a central, thicker section connected to the steering spindle holders, should this region need strengthening. In order to be able to achieve this type of forming of the second blank 14, partially like the forming of the first blank 1, there is a need for one or more additional plate presses or forging presses having cooperating die pads.

Alternatively, a varying thickness along the edges of the beam can be achieved in association with the final joining-together of the first and the second blank 1, 14; which operation is carried out in the last forging press 17 as depicted in FIG. 1. In this case, the thickness of the composite, forge-welded edge will vary along the longitudinal extent of the beam.

Figure 3:
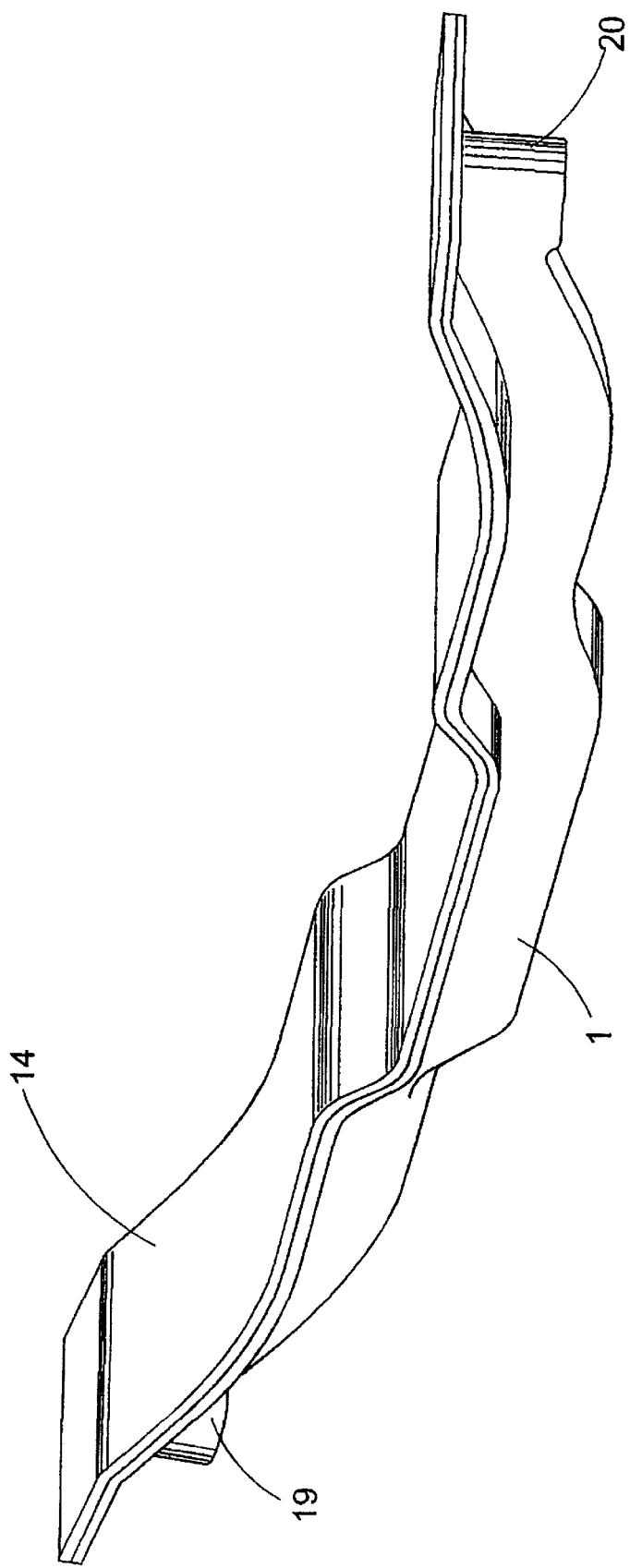
FIG. 3 is a perspective view directed toward the top and side of a front axle beam having the two composing sections configured according to FIG. 2, after having been joined together.

FIG. 3 shows an assembled front axle beam in which the first and second blank 1, 14 have been joined together, but not trimmed around the edges.

Figure 4:
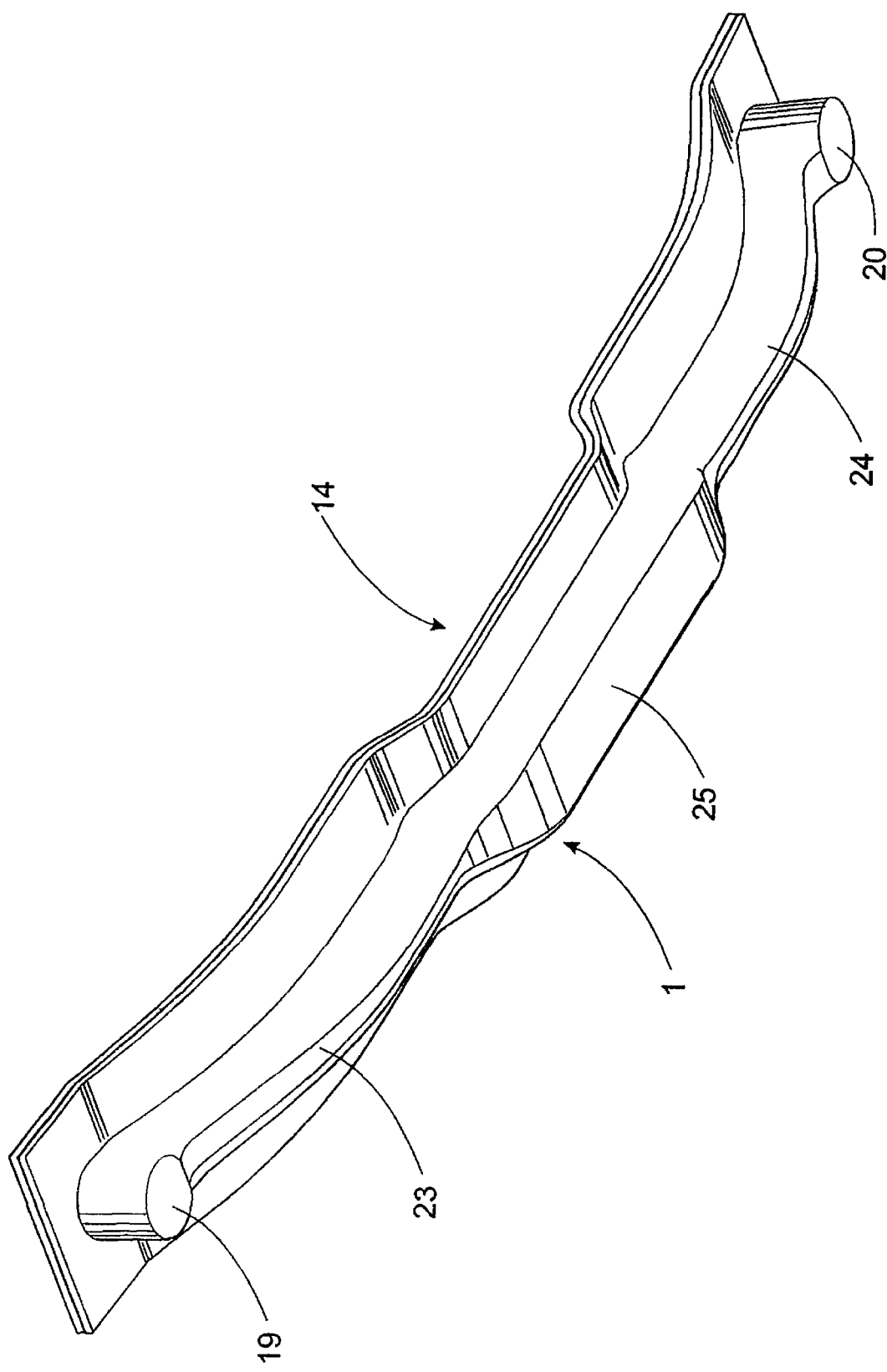
FIG. 4 is a perspective view directed toward the bottom and side of a front axle beam configured as in FIG. 3.

FIG. 4 shows a view of the assembled front axle beam from an angle viewed from below, with the varying horizontal and vertical extent of the first blank 1 along its length being clearly shown. The swan necks 23, 24 of the front axle beam, which connect the respective spindle holders 19, 20 to the central section 25 of the beam are shown prominently. Since this central section has to absorb extreme forces, it is dimensioned to offer high torsional rigidity and for which reason it has the maximum extent both in the transverse direction and vertical direction of the beam.

Figure 5:
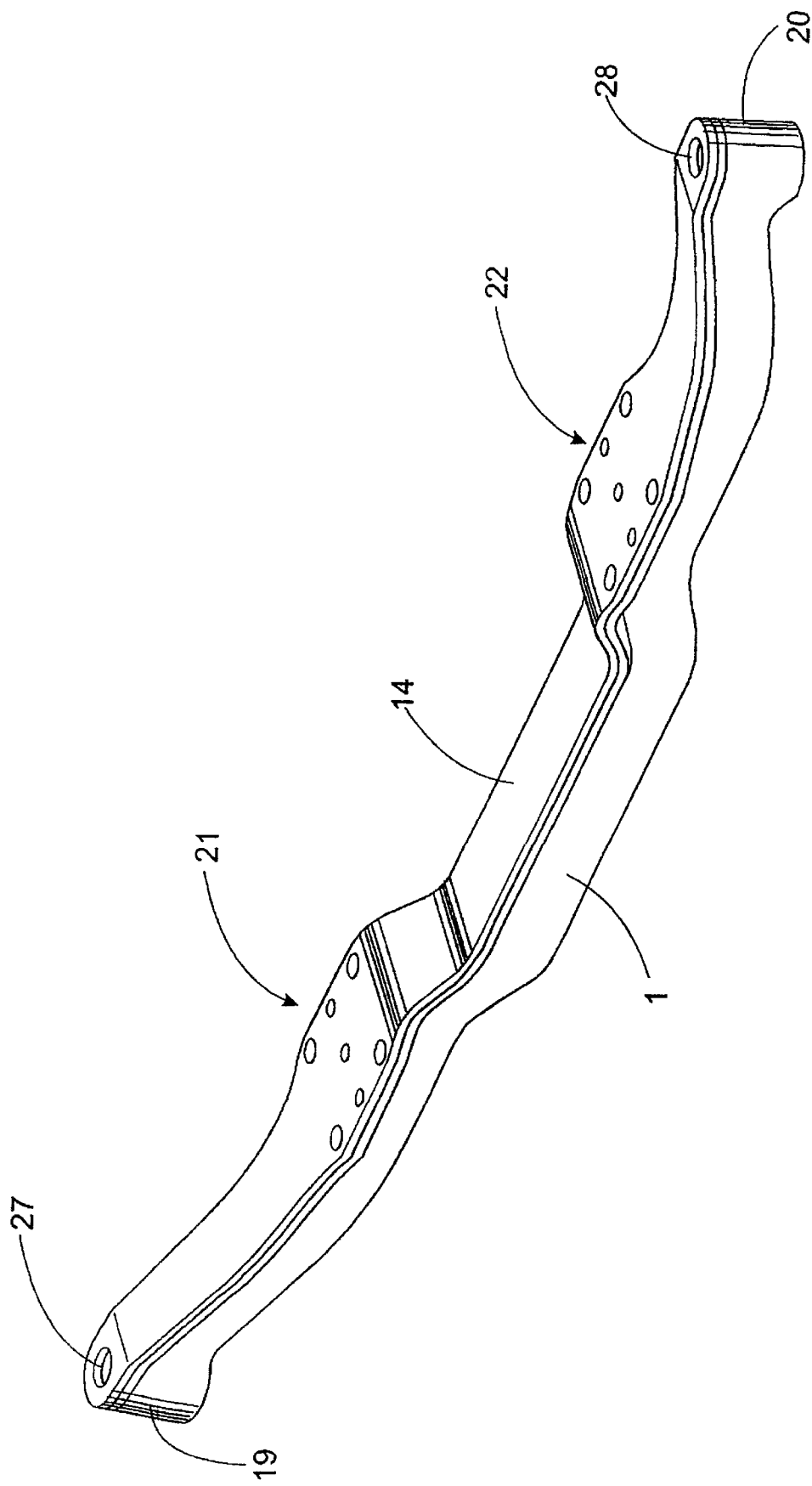
FIG. 5 is a perspective view directed toward the top and side of a finished front axle beam that has been cut to its final dimensions and provided with fastening points.

FIG. 5 shows a finished front axle beam that has been edge-trimmed to a predetermined width along its peripheral edge. In addition, the steering spindle holders 19, 20 have been worked and provided with through holes 27, 28 for fastening the spindle bolts. Holes have also been drilled for fixing elements at the fastening points 21, 22 for the air bellows (not shown) between the front axle beam and the vehicle chassis.

The invention is not limited to the above-stated embodiments, but can be applied to all types of construction elements that can be produced by the method described above.

The invention claimed is:

1. A method for producing a vehicle axle comprising:
   directing a first blank (1) through a furnace (2) and heating the blank (1) to a working temperature;
   directing the first blank (1) between a pair of rollers (3, 4) having profiled surfaces and thereby forming the first blank (1) into an intermediate product having a predetermined profile along a longitudinal extent thereof;
   feeding the first blank (1) to a forging press having a number of cooperating die pads, and working the first blank (1) by die forging to form a substantially finished product having a cross section substantially in the form of a hat profile of predetermined height, width and material thickness along a length thereof;

placing in connection with the hat profiled first blank (1), a second blank (14) having essentially the same profile as the hat profile of the first blank (1) in the dividing plane of the cooperating die pads; and joining the first (1) and the second blank (14) together at respective edges thereof and forming a composite vehicle axle (18), wherein the first and the second blank are simultaneously heated using heating means introduced between the first and second blank, which blanks are held between a pair of cooperating die pads in a press and the first and second blank are joined together by forge welding.

2. The method as recited in claim 1, wherein the heating is effected by means of one of induction elements, an induction furnace, and a gas flame.

3. A method for producing a vehicle axle comprising:

directing a first blank (1) through a furnace (2) and heating the blank (1) to a working temperature;

directing the first blank (1) between a pair of rollers (3, 4) having profiled surfaces and thereby forming the first blank (1) into an intermediate product having a predetermined profile along a longitudinal extent thereof;

feeding the first blank (1) to a forging press having a number of cooperating die pads, and working the first blank (1) by die forging to form a substantially finished product having a cross section substantially in the form of a hat profile of predetermined height, width and material thickness along a length thereof;

placing in connection with the hat profiled first blank (1), a second blank (14) that is substantially flat in that said second blank lacks a cavity but that otherwise matches the contours of an upper, joining surface of the first blank (1); and joining the first (1) and the second blank (14) together at respective edges thereof and forming a composite vehicle axle (18);

wherein the vehicle axle comprises said first blank having a cross section substantially taking the form of a hat profile and said second blank that forms a lid for the first blank and that is joined together with the first blank along side surfaces of the hat profile.

* * * * *